(12) United States Patent
Jimenez et al.

(10) Patent No.: US 9,834,641 B2
(45) Date of Patent: Dec. 5, 2017

(54) AMINOSILANE ADHESION PROMOTER FOR URETHANE SYSTEM

(71) Applicants: Rohm and Haas Company, Philadelphia, PA (US); Dow Global Technologies LLC, Midland, MI (US)

(72) Inventors: Jorge Jimenez, Lake Jackson, TX (US); Kevin K. Miyake, Ringwood, IL (US); Pavel L. Shutov, Linz (AT); David E. Vietti, Cary, IL (US); Joseph J. Zupancic, Glen Ellyn, IL (US)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 15/103,932

(22) PCT Filed: Nov. 25, 2014

(86) PCT No.: PCT/US2014/067205
§ 371 (c)(1),
(2) Date: Jun. 13, 2016

(87) PCT Pub. No.: WO2015/088764
PCT Pub. Date: Jun. 18, 2015

(65) Prior Publication Data
US 2016/0319068 A1    Nov. 3, 2016

Related U.S. Application Data

(60) Provisional application No. 61/915,089, filed on Dec. 12, 2013.

(51) Int. Cl.
| | | |
|---|---|---|
| *C08G 63/695* | (2006.01) | |
| *C08G 18/76* | (2006.01) | |
| *C08G 18/10* | (2006.01) | |
| *C08G 18/12* | (2006.01) | |
| *C08G 18/48* | (2006.01) | |
| *C08G 18/50* | (2006.01) | |
| *C09J 175/06* | (2006.01) | |
| *C08G 18/42* | (2006.01) | |
| *C08G 18/63* | (2006.01) | |
| *C08G 18/40* | (2006.01) | |
| *C08G 18/46* | (2006.01) | |

(52) U.S. Cl.
CPC ......... *C08G 63/6956* (2013.01); *C08G 18/10* (2013.01); *C08G 18/12* (2013.01); *C08G 18/4018* (2013.01); *C08G 18/4072* (2013.01); *C08G 18/4211* (2013.01); *C08G 18/4692* (2013.01); *C08G 18/4812* (2013.01); *C08G 18/4825* (2013.01); *C08G 18/5096* (2013.01); *C08G 18/632* (2013.01); *C08G 18/7621* (2013.01); *C08G 18/7671* (2013.01); *C09J 175/06* (2013.01)

(58) Field of Classification Search
CPC .... C08G 63/6956; C08G 18/10; C08G 18/12; C08G 18/40; C08G 18/42; C08G 18/5096; C08G 18/632; C08G 18/7671; C08G 18/4825; C08G 18/4072; C08G 18/4211; C08G 18/4692; C08G 18/4812; C08G 18/4018; C08G 18/7621; C09J 175/06
See application file for complete search history.

(56) References Cited

U.S. PATENT DOCUMENTS

| | | | |
|---|---|---|---|
| 3,309,261 A | 3/1967 | Schiller et al. | |
| 3,627,722 A | 12/1971 | Setter | |
| 3,632,557 A | 1/1972 | Brode et al. | |
| 3,979,344 A | 9/1976 | Bryant et al. | |
| 4,122,074 A | 10/1978 | Pepe et al. | |
| 4,163,073 A | 7/1979 | Pepe et al. | |
| 4,508,889 A | 4/1985 | Noren et al. | |
| 4,625,012 A * | 11/1986 | Rizk | C08G 18/10 156/330 |
| 5,091,465 A | 2/1992 | Dana et al. | |
| 5,364,955 A | 11/1994 | Zwiener et al. | |
| 6,001,946 A | 12/1999 | Waldman et al. | |
| 6,005,047 A | 12/1999 | Shaffer et al. | |
| 6,545,087 B1 | 4/2003 | Schmalstieg et al. | |
| 6,703,453 B1 | 3/2004 | Schmalstieg et al. | |
| 2009/0069497 A1* | 3/2009 | Roesler | C08G 18/0823 524/588 |
| 2011/0306723 A1 | 12/2011 | Choffat | |

FOREIGN PATENT DOCUMENTS

| | | |
|---|---|---|
| CA | 2835080 A1 * | 11/2012 |
| WO | 2013053453 A1 | 4/2013 |

\* cited by examiner

*Primary Examiner* — Rabon Sergent
(74) *Attorney, Agent, or Firm* — Kenneth Crimaldi

(57) ABSTRACT

A polyester polyol comprising at least one esterified unit of formula (I)

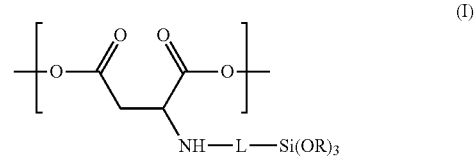

wherein L is a difunctional aliphatic group having from two to six carbon atoms and R is a $C_1$-$C_4$ alkyl group.

2 Claims, No Drawings

AMINOSILANE ADHESION PROMOTER FOR URETHANE SYSTEM

BACKGROUND

This invention relates generally to a silane-containing material useful as an adhesion promoter in polyurethane systems.

Polyurethane adhesives are commonly used to laminate flexible films for food packaging. The adhesives must not delaminate when the package is filled with liquid ingredients. Silanes are commonly used to maintain adhesion to metal films and impart water and chemical resistance, e.g., N-(2-Aminoethyl)-3-aminopropyltrimethoxysilane, 3-aminopropyl trimethoxysilane (APTMS) and 3-aminopropyltriethoxysilane (APTES) However, phase separation of the silanes may reduce the effectiveness of the relatively expensive silanes. U.S. Pat. No. 5,364,955 discloses adducts of aminosilanes and maleic or fumaric acid. However, there is a need for additional solutions to the problem of silane phase separation.

STATEMENT OF INVENTION

The present invention is directed to a polyester polyol comprising at least one esterified unit of formula (I)

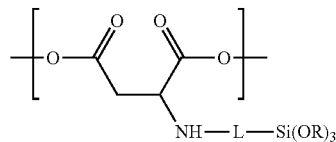

wherein L is a difunctional aliphatic group having from two to six carbon atoms and R is a $C_1$-$C_4$ alkyl group.

The present invention is further directed to a two-component polyurethane system comprising: (a) a polyol component comprising from 0.2 to 100 wt % of a polyester polyol comprising at least one esterified unit of formula (I)

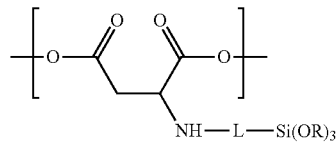

wherein L is a difunctional aliphatic group having from two to six carbon atoms and R is a $C_1$-$C_4$ alkyl group; and (b) an isocyanate-terminated prepolymer comprising polymerized residues of: (i) at least one of diphenyl methane diisocyanate (MDI), toluene diisocyanate (TDI), hexamethylene diisocyanate, hexamethylene diisocyanate trimer, isophorone diisocyanate, isophorone diisocyanate trimer, adduct of isophorone diisocyanate with trimethylolpropane, meta-xylylene diisocyanate, adduct of meta-xylylene diisocyanate with trimethylolpropane, meta-xylylene diisocyanate trimer, and bis(4-isocyanatocyclohexyl)methane, and blends of these the various isocyanate-terminated prepolymers; and (ii) a glycol or a second polyol.

The present invention is further directed to an adhesive comprising an isocyanate-terminated prepolymer; said prepolymer comprising esterified units of formula (I)

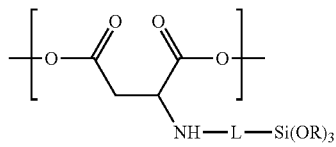

wherein L is a difunctional aliphatic group having from two to six carbon atoms and R is a $C_1$-$C_4$ alkyl group.

DETAILED DESCRIPTION

All percentages are weight percentages (wt %), and all temperatures are in ° C., unless otherwise indicated. Measurements and reactions have been carried out at ambient temperature (20-25° C.) unless otherwise specified. Percentages of monomer residues are on a solids basis, i.e., excluding solvents. A "polyester polyether polyol" is a polyol having both ester and ether linkages. These polymers are condensation products of polyether polyols (e.g., ethylene glycol, propylene glycol and their oligomers) with diacids or acid anhydrides, or are produced from the reaction of an alkylene oxide (e.g., ethylene or propylene oxide) with diacids or with esters derived from reaction of glycols or alcohols with acid anhydrides. "(Meth)acrylic" refers to either acrylic or methacrylic. "Phthalic acid" refers to benzene-1,2-dicarboxylic acid and "isophthalic acid" to benzene-1,3-dicarboxylic acid. Polymerized residues of phthalic acid may be the result of using either phthalic acid or phthalic anhydride as a starting material. Toluene diisocyanate (TDI) refers to the commercial product sold under this name, which is predominantly the 2,4-isomer, with small amounts of the 2,6-isomer, and possibly other isomers. Diphenyl methane diisocyanate (MDI) may be a mixture of 4,4' and 2,4' isomers.

The difunctional aliphatic group L preferably has at least three carbon atoms; preferably no more than five carbon atoms. Preferably L is a saturated aliphatic group. In one preferred embodiment, L also contains one nitrogen or oxygen atom. In one preferred embodiment L is —$(CH_2)_i$—, where i is an integer from two to four, preferably three.

In the polyester polyol, the structure of formula (I) typically is the result of reaction of at least one of maleic anhydride, maleic acid and fumaric acid with a diol or epoxide, followed by reaction of the resulting polyol with an aminosilane. Preferably, each diol is a $C_3$-$C_8$ α,ω-dihydroxy alkane or an alkylene glycol {H(OCH$_2$CHR$^1$)$_j$OH, where j is from one to twenty and R$^1$ is hydrogen, methyl or ethyl}. Preferably, the aminosilane is added in an amount insufficient to react with all of the polymerized maleic or fumaric acid units, so that the polyol also comprises these units in addition to units of formula (I). The polyester polyol may also contain esterified units of other diacids, preferably $C_4$-$C_{12}$ diacids, preferably $C_5$-$C_9$ diacids. Preferred diacids include glutaric acid, adipic acid, azelaic acid, sebacic acid, phthalic acid, terephthalic acid and isophthalic acid; particularly preferred diacids are adipic acid, azelaic acid, sebacic acid and isophthalic acid.

Particularly preferred diols include ethylene glycol, propylene glycol, 1,4-butanediol, 1,4-hexanediol, diethylene glycol, dipropylene glycol and higher oligomers of ethylene or propylene glycol (i.e., those having from three to twenty units). The polyester polyol optionally comprises triols or tetra-ols, e.g., trimethylol ethane, trimethylol propane, pentaerythritol and glycerol. Preferably, the higher oligomers of ethylene or propylene glycol have $M_n$ from 140 to 600, preferably from 140 to 400, preferably from 190 to 360. Preferably, the polyester polyol comprises from 0.5 to 60 wt % esterified units of succinic acid substituted by an aminosilane (i.e., units of formula (I)), from 5 to 74 wt % esterified units of maleic or fumaric acid and from 25 to 85 wt % esterified residues of at least one diol; preferably from 2 to 50 wt % esterified units of succinic acid substituted by an aminosilane, from 20 to 68 wt % esterified units of maleic or fumaric acid and from 30 to 75 wt % esterified residues of at least one diol; preferably from 5 to 35 wt % esterified units of succinic acid substituted by an aminosilane, from 30 to 60 wt % esterified units of maleic acid and from 35 to 65 wt % esterified residues of at least one diol; preferably from 10 to 25 wt % esterified units of succinic acid substituted by an aminosilane, from 30 to 50 wt % esterified units of maleic acid and from 40 to 60 wt % esterified residues of at least one diol. Preferably, the polyester polyol comprises no more than 80 wt % esterified triol residues based on the total amount of diol and triol, preferably no more than 60 wt %, preferably no more than 50 wt %.

Preferably, the polyester polyol has a hydroxyl number from 5 to 300 mg KOH/g; preferably at least 10 mg KOH/g, preferably at least 25, preferably at least 50, preferably at least 75, preferably at least 100; preferably not greater than 250 mg KOH/g, preferably no greater than 220, preferably no greater than 200.

In a preferred embodiment of the invention, the polyester polyol has the structure shown in formula (II)

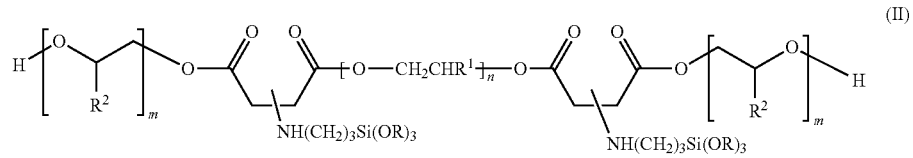

wherein $R^1$ and $R^2$ independently are hydrogen, methyl or ethyl; m is from 1 to 15 and n is from 2 to 20. The aminosilane substituent may be attached to either methylene group in the esterified maleic acid unit. The polyol of formula (II) may be produced by reaction of an alkylene glycol, $H(OCH_2CHR^1)_nOH$ with maleic anhydride, followed by reaction of the resulting diacid with an alkylene oxide and then reaction with the aminosilane. Preferably, $R^1$ is hydrogen or methyl, preferably hydrogen. Preferably, $R^2$ is hydrogen or methyl, preferably methyl. Preferably, m is from 2 to 12, preferably from 3 to 10, preferably from 4 to 8. Preferably, n is from 3 to 15, preferably from 3 to 12, preferably from 4 to 10. Preferably, the polyester polyol comprises from 0.5 to 35 wt % esterified units of succinic acid substituted by an aminosilane (i.e., units of formula (I)), from 5 to 44 wt % esterified units of maleic or fumaric acid and from 50 to 85 wt % esterified residues of alkylene glycols; preferably from 2 to 30 wt % esterified units of succinic acid substituted by an aminosilane, from 14 to 35 wt % esterified units of maleic or fumaric acid and from 55 to 80 wt % esterified residues of alkylene glycols; preferably from 5 to 28 wt % esterified units of succinic acid substituted by an aminosilane, from 15 to 30 wt % esterified units of maleic or fumaric acid and from 57 to 75 wt % esterified residues of alkylene glycols; preferably from 10 to 25 wt % esterified units of succinic acid substituted by an aminosilane, from 10 to 20 wt % esterified units of maleic or fumaric acid and from 60 to 75 wt % esterified residues of alkylene glycols.

In a preferred embodiment of the invention, the polyester polyol contains esterified residues of: (i) succinic acid substituted by an aminosilane (i.e., units of formula (I)), (ii) maleic or fumaric acid, (iii) at least one $C_4$-$C_{12}$ diacid other than formula (I), maleic or fumaric acid, and (iv) a $C_2$-$C_{12}$ diol. The $C_2$-$C_{12}$ diol may be an α,ω-dihydroxy alkane or an alkylene oxide or oligomer. Preferred $C_2$-$C_{12}$ diols include ethylene glycol, propylene glycol, 1,4-butanediol, 1,4-hexanediol, diethylene glycol, dipropylene glycol and oligomers of ethylene or propylene glycol (i.e., those having more than two units). Preferably, the polyester polyol further comprises from 0 to 30 wt % esterified units of a $C_4$-$C_{12}$ diacid other than formula (I), maleic or fumaric acid; preferably from 0 to 20 wt %, preferably from 5 to 15 wt %. Preferably, the diacid is a $C_5$-$C_9$ diacid. Preferably, the polyester polyol comprises from 0.5 to 60 wt % esterified units of succinic acid substituted by an aminosilane (i.e., units of formula (I)), from 10 to 74 wt % esterified units of at least one $C_4$-$C_{12}$ diacid other than formula (I) (including units of maleic or fumaric acid) and from 25 to 85 wt % esterified residues of at least one diol; preferably from 2 to 50 wt % esterified units of succinic acid substituted by an aminosilane, from 20 to 68 wt % esterified units of at least one $C_4$-$C_{12}$ diacid other than formula (I) and from 30 to 75 wt % esterified residues of at least one diol; preferably from 5 to 35 wt % esterified units of succinic acid substituted by an aminosilane, from 30 to 60 wt % esterified units of at least one $C_4$-$C_{12}$ diacid other than formula (I) and from 35 to 65 wt % esterified residues of at least one diol; preferably from 10 to 25 wt % esterified units of succinic acid substituted by an aminosilane, from 30 to 50 wt % esterified units of at least one $C_4$-$C_{12}$ diacid other than formula (I) and from 40 to 60 wt % esterified residues of at least one diol.

In one preferred embodiment of the invention, the polyester polyol is produced by the steps allowing maleic anhydride to react with an alkylene glycol oligomer, $H(OCH_2CHR^1)_nOH$ at a temperature from 80° C. to 150° C., preferably from 90° C. to 140° C. Preferably, the reaction mixture is then heated to a temperature from 160° C. to 250° C., preferably from 200° C. to 225° C. Reaction times of course will vary with the other conditions, and can be determined easily by one skilled in the art, but typically are in the range from 5 hours to 30 hours, preferably from 12 to 25 hours. Preferably, the reaction pressure is about atmospheric pressure (about 100 kPa), although reduced pressure may be used to assist in removing water formed in the esterification reaction. Preferably, an esterification/transesterification catalyst is present in an amount no more than 0.2 wt %, preferably no more than 0.05 wt %. These catalysts are well known in the art and include tin, titanium, bismuth and zirconium catalysts. Tin catalysts are preferred, especially alkyltin tris-alkanoates and hydroxybutyl tin oxide, but titanates, e.g., tetra-alkoxy titanates or bismuth alkanoates or mixtures thereof may also be used.

In the two-component polyurethane system, preferably the polyol component comprises at least 0.5 wt % of a polyester polyol comprising at least one esterified unit of formula (I), preferably at least 5 wt %, preferably at least 10 wt %, preferably at least 20 wt %. Preferably, the polyol component comprises no more than 99 wt % of a polyol not comprising at least one esterified unit of formula (I), preferably no more than 95 wt %, preferably no more than 90 wt %, preferably no more than 80 wt %. Preferably, the aminosilane is added to the polyol component and reacts in situ with the esterified maleic acid units.

Preferably, the isocyanate-terminated prepolymer comprises polymerized residues of MDI and/or TDI and a glycol or polyol. Preferably, at least 80 wt % of the polymerized residues of isocyanates in the isocyanate-terminated prepolymer are from MDI and TDI, preferably at least 85 wt %, preferably at least 90 wt %, preferably at least 95 wt %. Preferably, at least 50 wt % of the MDI residues are from the 4,4' isomer, preferably at least 70 wt %, preferably at least 80 wt %, preferably at least 90 wt %, preferably at least 95 wt %. The difunctional aromatic isocyanate is mixed with a polyol to form the isocyanate-terminated prepolymer. The isocyanate-terminated prepolymer preferably has 1 to 21 wt % isocyanate groups, preferably 2 to 18 wt %, preferably 3 to 15 wt %. The isocyanate-terminated prepolymer optionally contains polymerized residues of a glycol having $M_n$ from 300 to 3500 in an amount up to 85 wt %, preferably up to 70 wt %, preferably up to 50 wt %, preferably up to 40 wt %, preferably at least 10 wt %, preferably at least 20 wt %, preferably at least 30 wt %. Preferably, $M_n$ is at least 400, preferably at least 600, preferably at least 900; preferably no more than 17000, preferably no more than 4500, preferably no more than 3000. Preferably, the glycol comprises polymerized residues of ethylene glycol, propylene glycol, butylene glycol, 1,4-butanediol or a mixture thereof, preferably polyethylene glycol, polypropylene glycol or a mixture thereof. In a preferred embodiment of the invention, the polyol mixed into the isocyanate component is at least one difunctional or trifunctional polymer of ethylene oxide, propylene oxide or a combination thereof.

In the two-component urethane system, the relative proportions of isocyanate groups to isocyanate-reactive groups may vary as desired, preferably within a molar ratio of NCO/OH groups of 0.9:1 to 2:1. Preferably, the NCO/OH group molar ratio is from 1:1 to 1.8:1, alternatively from 1.1:1 to 1.6:1, alternatively from 1.2:1 to 1.4:1.

Preferably, the components of the two-component urethane system are diluted with solvent prior to coating onto a substrate. As the term is used herein, a solvent is a substance which is liquid at 25° C. and has a boiling point at atmospheric pressure of no more than 100° C. Preferably, the combined components of the system as applied to the substrate contain from 45-60 wt % solids, preferably from 46-57 wt %, preferably from 47-55 wt %, preferably from 48-53 wt %. Suitable solvents include ethyl acetate, methyl acetate and methyl ethyl ketone. Ethyl acetate is especially preferred.

The two components of the urethane system preferably are mixed using a suitable mixer (e.g., an electrically, pneumatically, or an otherwise powered mechanical mixer, or a static mixer) prior to or during application to a substrate to form the bonding agent. Thus, the isocyanate component typically will be packaged separately from the polyol component. Mixing may take place at any suitable time prior to the laminating process. All of the present steps may be carried out under ambient room temperature or supra-ambient conditions. For example, the two components may be heated just prior to mixing and applied at elevated temperature during the coating and lamination process. Preferably, the temperature does not exceed 65° C. As desired, heating or cooling may be applied to the resulting laminate. Preferably, a gravure cylinder is used to transfer the mixed adhesive composition to a film, which is then laminated to a second film.

The two-component urethane system is useful for bonding two to five substrates together. The substrates may be similar material or dissimilar material. Preferably, a layer of the bonding agent is applied to a first substrate layer, and the resulting bonding agent layer is covered with a second substrate layer to form a laminated article wherein the two substrates are bonded together by the dried layer of bonding agent. A third and fourth layer of film can be added to the laminate to form three- or four-layer laminates. Preferably, the substrate layers are provided in the form of rolls of substrate material. The sheets may be on the order of 0.5 to 10 mils (0.0127 to 0.254 mm) in thickness. Larger thicknesses are also possible, as are smaller thicknesses (e.g., on the order of 5 or more microns).

In an adhesive comprising an isocyanate-terminated prepolymer comprising esterified units of formula (I), preferably the difunctional aliphatic group L has at least three carbon atoms; preferably no more than five carbon atoms. Preferably L is a saturated aliphatic group. In one preferred embodiment, L also contains one nitrogen or oxygen atom. In one preferred embodiment L is —$(CH_2)_i$—, where i is an integer from two to four, preferably three. Preferably, the isocyanate-terminated prepolymer is produced from a polyester polyol comprising at least one esterified unit of formula (I), as described herein, and a diisocyanate, as described herein, and optionally another polyester polyol as described herein. Preferably, the isocyanate-terminated prepolymer has 0.5 to 18 wt % isocyanate groups, preferably 1 to 12 wt %, preferably 2 to 6 wt %.

The compositions of the present invention can be applied to desired substrates using conventional application techniques such as rotogravure printing, flexographic printing, conventional or airless spray, roll coating, brush coating, wire wound rod coating, knife coating, or coating processes such as curtain-, flood-, bell-, disc-, and dip-coating processes. Coating with the bonding agent may be done over an entire surface or only a portion of it, such as along an edge, or at intermittent locations. The bonding agent is particularly attractive for packaging and sealing applications for laminating plastic films, metal films or metallized plastic films. Especially preferred films include low density polyethylene, high density polyethylene, polypropylene (cast, blown oriented, biaxially drawn), nylon, polystyrene, co-extruded films, polyester film, ceramic (SiOx, AlOx) coated film (polyester, nylon, etc.), polyacrylic acid-coated film (polyester, nylon, etc.), polyvinylidene chloride coated film, metallized film (polyester, polypropylene, etc.).

EXAMPLES

Unless noted otherwise, viscosities were measured using a Brookfield viscometer operating at a temperature of approximately 25° C. and with fittings appropriate for the viscosity ranges measured. Resins were prepared as described in the following procedures.

Example 1. Preparation of Polyester Resin

| Item | Monomer/Intermediate | Percent of Charge |
|---|---|---|
| 1 | Phthalic Anhydride | 42.86 |
| 2 | Diethylene Glycol (DEG) | 33.35 |

| Item | Monomer/Intermediate | Percent of Charge |
| --- | --- | --- |
| 3 | FASCAT 9100 * | 0.07 |
| 4 | Ethyl acetate | 23.72 |

* butylstannoic acid [CAS #2273-43-0] from Arkema Company

1. Items 1-3 were charged to a reactor equipped with a stirrer, thermocouple, nitrogen inlet, a steam jacketed fractionating column and a condenser for collecting water that distilled from the reactor. A very slow stream of nitrogen was passed through the head space of the reactor throughout the time of the reaction.
2. The heterogeneous mixture was heated to 100-120° C. The external heat was reduced and the heat of reaction carried the temperature to about 130° C. The temperature was held at 120-130° C. for 0.25-0.50 Hrs.
3. The resin mixture was heated gradually to 225° C. At about 190° C. water began to distill. After 85-95% of the theoretical amount of water was collected, samples were periodically drawn from the reactor and tested for viscosity (cone & plate at 100° C.) and acid number. When the acid number was less than 20 mg KOH/g sample, vacuum was applied and the distillation continued under reduced pressure. Initially the pressure was set at 450 torr. The vacuum was gradually decreased to about 25 torr. Pressure was held at about 20-30 torr and the temperature maintained at 225° C. until the acid number was less than 2.0 mg KOH/g sample.
4. The product was cooled and combined with the ethyl acetate.

The resin had the following properties: 74.7% solids, OHN* 24 mg KOH/g; acid value (AV*) 1.4, OHN 24; viscosity, 814 mPa·s at 25° C.

*OHN=Hydroxyl Number, measured by the method of ASTM E1899-08

AV=Acid Value, measured by the method of ASTM D3644-06 (American Society for testing and Materials, Conshohocken, Pa., USA).

Example 2. Preparation of Polyester Resin

| Item | Object description | % of Charge |
| --- | --- | --- |
| 1 | Diethylene Glycol | 33.35% |
| 2 | Phthalic Anhydride | 42.86% |
| 3 | FASCAT 9100 | 0.07% |
| 4 | Ethyl Acetate | 23.72% |

1. Items 1-3 were charged to a reactor equipped with a stirrer, thermocouple, nitrogen inlet, a steam jacketed fractionating column and a condenser for collecting water that distilled from the reactor. A very slow stream of nitrogen was passed through the head space of the reactor throughout the time of the reaction.
2. The heterogeneous mixture was heated to 100-120° C. The external heat was reduced and the heat of reaction carried the temperature to about 130° C. The temperature was held at 120-130° C. for 0.25-0.50 Hrs.
3. The resin mixture was heated gradually to 225° C. At about 190° C. water began to distill. After 85-95% of the theoretical amount of water was collected, samples were periodically drawn from the reactor and tested for viscosity (cone & plate at 100° C.) and acid number. When the acid number was less than 20 mg KOH/g sample, vacuum was applied and the distillation continued under reduced pressure. Initially the pressure was set at 450 torr. The vacuum was gradually decreased to about 25 torr. Pressure was held at about 20-30 torr and the temperature maintained at 225° C. until the acid number was less than 2.0 mg KOH/g sample.
4. The product was cooled and combined with the ethyl acetate.

The resin had the following properties. Prior to adding solvent: acid value, 1.7 mg KOH/g; cone and plate viscosity at 100° C., 2080 mPa·s. After adding ethyl acetate: 75.5% solids, OHN 27 mg KOH/g; acid value 1.2; viscosity 750 mPa·s at 25° C.

Example 3. Preparation of Hydroxyfunctional (Hydroxyethyl) Acrylic in Polyol

|  | Mix A | Mix B |
| --- | --- | --- |
| Butyl Methacrylate | 1.6 lb (0.73 kg) |  |
| Hydroxyethyl Acrylate | 122.1 lb (55.5 kg) |  |
| Butyl Acrylate | 624.9 lb (284.1 kg) |  |
| VAZO 64 |  | 9.5 lb (4.3 kg) |
| Acetone |  | 111 lb (50.5 kg) |

Prepared Mix A and Mix B in stirred tanks. Stirred each mix for at least 30 minutes. Mix B may be stirred longer if necessary to completely dissolve the VAZO 64. Charged 896.8 lbs (408 kg) of polyol VORANOL 230-238 (Dow Chemical Co.) to reactor equipped with jacket for heating/cooling and reflux condenser. Purged the reactor with a slow stream of nitrogen throughout the process. Heated the reactor to 80° C. with agitation. Held the batch at 80° C. for 30 min. Started feeding Mix B at 0.25 lb/min (0.11 kg/min) and continued feeding for 30 minutes. While continuing to feed Mix B, started feeding Mix A at 0.75 lbs/minute (0.34 kg/min) and continued feeding for one hour. While still feeding Mix B, increased the feed rate of Mix A to 1.5 lbs/min (0.68 kg/min) and continued feeding for 8 hours. The feed of Mix A and B were completed at about the same time. Charged 224.2 lb (102 kg) of VORANOL 230-238 to the reactor and rinsed the Mix B feed line with 10 lb (4.5 kg) of acetone. Set the reactor for distillation rather than reflux, pulled vacuum on the reactor and heated to 135° C. Continued vacuum distillation for 1 hour. Started a flow of nitrogen through the bottom of the reactor. Continued to sparge the reactor with nitrogen while distilling under vacuum for 10 hours. Cooled to 50° C. or less then packaged. Product viscosity was 2155 mPa·s; OH number 176 mg KOH/gram sample; Mn 14,200, Mw 27,000.

Example 4. Preparation of Polyester Resin Blend

| Item number | Item | % of Charge |
| --- | --- | --- |
| 1 | Polyester Resin, Example 1 | 99.34 |
| 2 | Acrylic Resin, Example 3 | 0.6 |
| 3 | Phosphoric acid (85%) | 0.06 |

Item number 1 was placed in a stirred reactor. If it was still warm from the polyester preparation, it was cooled to <60°

C. Items 2 and 3 were added to the stirred resin solution and vigorous stirring continued for 30 minutes. The acrylic resin does not completely dissolve but gives a stable hazy dispersion.

Example 5. Preparation of Polyester Resin Containing Maleate

| Item Number | Item | Charge | % of Charge |
|---|---|---|---|
| 1 | Trimethylolpropane (TMP) | 46.74 | 1.33% |
| 2 | Diethylene Glycol (DEG) | 1949.80 | 55.61% |
| 3 | Adipic Acid | 589.50 | 16.81% |
| 4 | Maleic Anhydride | 919.78 | 26.23% |
| 5 | FASCAT 9100* | 0.47 | 0.01% |
| | Total | 3506.29 | 100.00% |
| | Estimated Moles Maleic Anhydride/gram product | | 0.0029 |

*butylstannoic acid [CAS #2273-43-0] from Arkema Company

1. Charged monomers and catalyst (items 1-5) to a 5 liter 4 neck flask equipped with stirrer, thermocouple/temperature controller, nitrogen inlet/outlet and a distillation head/condenser.
2. Passed a slow stream of nitrogen through the reactor during the distillation at atmospheric pressure.
3. Gradually increased temperature and began to collect water distillate at about 160° C. Increased temperature to 225° and maintained this temperature until 85-90% of the theoretical water was collected.
4. Connected the reactor to vacuum pump and reduced pressure to about 500 mm Hg. Gradually reduced the pressure to 300 mm Hg over about 1 hour. Held at 225° C. and 300 mm Hg for an additional hour. Tested a sample of the product and found an acid value of 1.8 mg KOH/g, OHN of 179 mg KOH/g and cone and plate viscosity of 81.25 mPa·s at 100° C.

Example 6. Preparation of Polyester Resin

| Item Number | Item | Percent of Charge |
|---|---|---|
| 1 | Isophthalic Acid | 35.72% |
| 2 | Diethylene Glycol | 36.22% |
| 3 | Ethylene Glycol | 4.87% |
| 4 | Tetraisopropyl Titanate | 0.01% |
| 5 | Adipic Acid | 23.19% |

A polyester resin was prepared with isophthalic acid, diethylene glycol, ethylene glycol, adipic acid and catalyst (items 1-5) by heating to 225° C. and removing water by distillation as described in previous examples. The product had the following properties: Acid Value, 1.1 mg KOH/g; Hydroxyl Number, 57.1 mg KOH/g.

Example 7. Polyester-Polyether Polyol (WO2013053555 A2, "Hybrid Polyester-Polyether Polyols for Improved Demold Expansion in Polyurethane Rigid Foams" Jorge Jimenez, Pavel L. Shutov, William N. Felsted, Melissa M. Rose, Davide Micheletti.)

2011.0 g (7.89 mol) of VORANOL*CP260 triol polyether polyol, 1520.4 g (10.25 mol) phthalic anhydride and 0.20 g of 2-Ethyl-4-Methyl-Imidazole (EMI, 41 ppm based on the weight of product) are mixed with stirring at 50 rpm in 5 L stainless steel alkoxylation reactor. The reaction mixture is flushed 10 times with 6 bar (600 kPa) nitrogen (N2) pressure. The reactor is thermostated at 130° C. with 6 bar of $N_2$ pressure. The obtained slurry gradually dissolves in the reactor, becoming mainly liquid after 0.5 h at this temperature. The stirring rate is gradually increased from 50 to 200 rpm. The reactor content is stirred for an additional 1.5 h. The $N_2$ pressure in the reactor is reduced to 1.0 bar, and the stirring rate is increased to 300 rpm. PO (1246.0 g, 21.46 mol) is fed to the reactor at a feed rate of 15 g/min over 85 min. The immediate reaction start is accompanied by an exotherm. At the completion of the feed the total pressure in the reactor has reached 4.9 bar (490 kPa). 3.0 h of additional digestion time is allowed. The total pressure in the reactor decreases to 4.3 bar (430 kPa). The reactor temperature is decreased to 100° C. 6.80 g of a 10% solution of triflic acid (TFA, 142 ppm based on the weight of product) in ethanol is injected into the reactor with the help of a pressurized stainless steel bomb, connected to the reactor. Immediate pressure drop in the reactor and an exotherm are observed. 30 min of additional digestion time is allowed. Residual nitrogen pressure is vented off, the reaction mixture is flushed 10 times with 6 bar (600 kPa) N2 pressure. Potassium hydroxide (7.16 g, 0.5 mol/l solution in ethanol) is injected into the reactor with the help of a pressurized stainless steel bomb, connected to the reactor, in order to neutralize the remaining triflic acid. The product is then stripped in vacuum for 1 h at 120° C. A colorless viscous liquid is obtained.

The produced hybrid polyester-polyether polyol has the following properties: OH value: 276 mg KOH/g; Viscosity at 25° C.: 31700 mPa·s; Density at 25° C.: 1.156 g/cm$^3$; pH: 5.9; Mn=460 g/mol, Mw/Mn=1.17.

Example 8. Preparation of Polyester-Polyether with Maleate

The general procedure described in Example 7 was followed, except 2 moles of maleic anhydride were reacted with one mole of 300 molecular weight polyethylene glycol to form the ester. Six moles of propylene oxide were added and reacted at 140° C. using 220 ppm double metal cyanide (DMC) catalyst from Bayer (ARCOL catalyst 3, dry) and 320 ppm aluminum tri-sec-butoxide from Aldrich Chem. Co. (CAS #2269-22-9). Analysis of the product: OHN 135 mg KOH/g sample; Density @ 25° C., 1.148 kg/L; cone and plate viscosity @ 25° C., 1930 mPa·s.

Example 9. Preparation of Isocyanate Terminated Coreactant

| Item | Monomer/Intermediate | Charge (g) | Percent of Charge |
|---|---|---|---|
| 1 | 4,4'-Diphenylmethane diisocyanate (ISONATE 125M) | 200 | 55.75% |
| 2 | Polypropylene glycol, Mw 430 (VORANOL 220-260) | 97.4 | 27.15% |
| 3 | Propoxylated Glycerine, Mw 450 (VORANOL CP450) | 7.46 | 2.08% |
| 4 | Ethyl Acetate | 53.8 | 15.00% |
| 5 | Benzoyl chloride | 0.1 | 0.03% |
| | Total | 358.76 | 100.0% |

1. Item 1 was placed in a 50° C. oven to melt MDI. The molten MDI was charged to a dry reactor that had been warmed to 50° C. in an oven. The reactor was kept under an atmosphere of dry nitrogen throughout the reaction time.
2. A mixture of items 2 and 3 was charged to the reactor with stirring and the resin mixture was maintained at 50-60° C. for 30 minutes.
3. The reaction mixture was heated to 80° C. and held at 80° C. for 2 hours.
4. The resin was cooled to 60° C. and items 4 and 5 were added and thoroughly mixed.
5. The resin was cooled to 50-60° C., filtered and packaged.

The product had the following properties: 85% solids, viscosity 340 mPa·s at 25° C., and 12.5% NCO (% NCO was measured by the method of ASTM D2572-97).

Example 10. Preparation of Prepolymer from Polyester

| Item Number | Item | Percent of Charge |
|---|---|---|
| 1 | ISONATE 125 M MDI | 15.32% |
| 2 | Polyester Resin Example 6 | 59.87% |
| 3 | Ethyl Acetate | 24.81% |

1. Items 1-3 were combined in a stirred reactor.

2. The reactor was kept under an atmosphere of dry nitrogen and gradually heated to 80° C.

3. After holding at 80° C. for one hour, the product was cooled, filtered and packaged. Analysis: 2.7% NCO by titration, 75.6% solids, 3450 mPa·s at 25° C.

Example 11. Products from Adding 3-Aminopropyl Triethoxysilane (APTES) to Polyester Example 5

Blends were made by adding 3-aminopropyl triethoxy silane, (Dynasylan AMEO from Evonic Industries AG) to the polyester from Example 5 [approximately 0.0029 moles of maleic anhydride (MA)/gram of polyester] in the proportions shown in Table 1

Table 1. Blends of APTES with Example 5 polyester Blends of APTES with Example 5 polyester were combined with the prepolymer, Example 9. The appearance after these were combined is noted in Table 1.

TABLE 1

Blends of APTES with Example 5 polyester

| Ex. No. | Ex. 5 (grams) | Moles MA | APTES (Grams) | Moles APTES | Moles MA/ APTES | Initial Viscosity (Pa·s) | % APTES | Appearance of blend with Example 9* |
|---|---|---|---|---|---|---|---|---|
| 11A | 18.9 | 0.05 | 5.5 | 0.025 | 2 | 2.551 | 22.5% | Clear |
| 11B | 18.9 | 0.05 | 2.8 | 0.013 | 4 | 3.875 | 12.9% | Clear |
| 11C | 18.9 | 0.05 | 1.4 | 0.006 | 8 | 5.232 | 6.9% | Clear |
| 11D | 9.45 | 0.025 | 5.5 | 0.025 | 1 | 1.23 | 36.8% | Hazy |
| 5 | | | | | | 6.531 | | |

*Blended 1 part of the APTES/polyester mix with 9 parts of the isocyanate terminated prepolymer (Example 9) component of a two part adhesive Example 12. Blends of 3-aminopropyl triethoxysilane and polyester-polyether, Example 8.

When 3-aminopropyl triethoxysilane (DYNASYLAN AMEO from Evonic Industries, AG) or blends of AMEO with simple polyesters like those in Example 1, Example 2, or Example 6, were added to common prepolymers used for adhesive coreactants (e.g. Example 9), a white precipitate quickly formed. Presumably, this is from the rapid reaction between the amine and the isocyanate to form insoluble urea derivatives. However, when the 3-aminopropyl triethoxysilane was previously blended with the maleate containing polyester (Example 5) a clear mixture was obtained as long as there was a molar excess of maleate over amino silane.

Note: the APTES/polyester blends, Example 11, built viscosity over time and gelled within two weeks. However, when these blends were added to other polyesters like those in Example 1, Example 4 and Example 6 to give solutions containing 0.1-1% APTES, the blends remained clear and stable for months. Alternatively, the polyester containing maleate and the APTES could be added directly to the polyol portion of a two component adhesive. This gave a stable solution that did not rise appreciably in viscosity or form insoluble material on standing.

TABLE 2

Blends of polyester-polyether with APTES

| Ex. No. | Example 8 grams | Moles MA* | APTES Grams | Moles APTES | Moles MA/APTES | Initial Viscosity** Pa · s | % APTES | Viscosity After 30 Days (Pa · s) |
|---|---|---|---|---|---|---|---|---|
| 12A | 18 | .04 | 2 | .009 | 4.8 | 1500 | 10 | 7,215 |
| 12B | 14 | .034 | 6 | .027 | 1.25 | 559 | 30 | 9,939 |
| 8 | | | | | | 2082** | | |

*Estimated moles of maleate from maleic anhydride (MA) based on 416 grams polyol/mole maleate
**Cone and plate viscosity with 40 mm cone at 10 sec$^{-1}$. The viscosity of the polyester-polyether was slightly higher than that recorded when it was first made (1930 Pa · s).

The polyester-polyether and APTES were combined in the proportions shown in Table 2 with stirring at ambient temperature. The samples (especially 12B) increased in temperature (not recorded) as they were stirred. Both samples A and B gave clear solutions when combined with the isocyanate terminated prepolymer portion of the adhesives. These products did not rise in viscosity as rapidly as the blends in Example 11 and they gave stable solutions when diluted with the polyol portions of adhesives to give 0.1-1% APTES.

Example 13. Preparation and Testing of Laminates

Preparation of Laminate (Representative Procedure)
Films tested were: 12 or 24 micron thick polyethylene terephthalate (48 LBT, 92LBT); pre-laminated film made from a polyethylene terephthalate (PET, 12 micron (μm) thick) laminated to soft lamination grade AMCOR aluminum foil (9 μm thick) with ADCOTE 550/COREACTANT F (Dow Chemical Co.) [This laminated structure was obtained from AMPAC Company, Cary, Ill. and is referred to as "Prelam" or PET-Al]; polyethylene containing high amount of slip additive (GF19) and Polyethylene sealant film, Pliant 808.24, from Berry Plastics. Samples of the films were cut into approximately 9"×12" (23×30 cm) sections. Films requiring corona treatment were treated to obtain a surface energy of 36 dynes or higher. The secondary film was placed on the rubber pad of the laminator (treated side up). A strip of paper about 5 cm wide and 20 cm long was laid across the center of the sheet to provide an unlaminated strip area to separate the films for the peel testing. The two components of the adhesive were combined and diluted to 30-50% solids.
The primary film was attached to a hard flat surface (treated side up). The adhesive was applied to the aluminum side of the PET-Al laminate or to polyester film with a Meyer wire wound rod (primary film). The coat weight was approximately (2.75-3.0 g/m$^2$). If necessary, the adhesive concentration was adjusted to obtain the target coat weight. The solvent was evaporated from the adhesive by placing the coated film in an 80° C. forced air oven for about 30 seconds. The primary film was removed from the plate and the top edge of the film (adhesive side down) mated to the top of the secondary film on the laminator pad. The oil heated (ca. 82° C.) roller of the laminator was passed over the films pulling the primary film in contact with the secondary film and laminating the two films together. The initial or "green" bonds were tested as soon as possible after the laminate was made. The sheets of were placed between two hard surfaces (e.g. steel plates) with sufficient weight on the top sheet to keep the sheets of laminate pressed together until curing was complete. The 90° T-peel test was done on laminate samples cut to 15 mm or 25.4 mm (1 inch) wide strips and pulled on Thwing Albert tester at a rate of 10"/min (25.4 cm/min). When the two films in the laminate separated (peeled), the average of the force during the pull was recorded. If one of the films stretched or broke, the maximum force or force at break was recorded. The values were the average of three separate sample strips.

The following notations are used in the tables to describe the laminates and the test results: Laminate structures are shown with the primary film (film adhesive is applied to) on the left and secondary film (usually PE sealant film) on the right. For example, PET-Al/808.24 indicates that the adhesive was applied to the aluminum side of the PET-Al "prelam" then laminated to the 808.24 PE film from Berry Plastics. The mode of failure (MOF) notes where the adhesive was observed after the laminate was peeled or if the film broke (DES for destruct) or if the adhesive held the films in place and the PE film stretched as it was pulled (FS). In these instances, the maximum force is recorded. If the adhesive stays on the primary film and fails to adhere to the secondary, the notation is AF for adhesive failure. If the adhesive is seen on the secondary film and not on the primary after the peel test, the notation is AT for adhesive transfer from primary to secondary. If adhesive is seen on both films the notation is AS for adhesive split. For AS, AF or AT, the average force during the peel test is recorded. The mode of failure is noted from visual observations. Sometimes it may be difficult to be certain about the location of the adhesive, but the best estimate is recorded.

Boil in Bag Test Procedure
Cut out rectangles of film of suitable size to make finished pouches with an interior size of 4×6" (10×15 cm) (or cut out a rectangle twice as large and fold over)
Set the heat sealer to the conditions necessary to achieve a good heat seal bond (e.g. 350° F./1 sec/40 psi) (177° C./1 sec/2.76 kPa). Heat seal the bottom and sides of the rectangle pieces or the bottom and side of the larger rectangle. Fill the pouches with 100±5 ml of 1:1:1 sauce (blend of equal parts by weight of catsup, vinegar and vegetable oil). Avoid splashing the filling onto the heat seal area or the heat seal will be poor. After filling, carefully seal the top of the pouch in a manner that minimizes air entrapment inside of the pouch.
Inspect seal integrity on all four sides of pouches to ensure likelihood of passing boiling test. Discard suspect pouches and make new ones to replace.
Fill a pot ⅔ full of water and bring to a rolling boil. Ensure hot plate is of proper size to maintain boil with pouches present for one hour. Inspect boiling pot while under test to ensure enough water is present to maintain boiling and to prevent it from boiling dry. Use lid to minimize water and steam loss.

Carefully place the pouch(es) in the boiling water and leave there for ½ hour. When complete, record the extent of tunneling, delamination, or leakage, comparing to the pre-existing flaws.

Cut open the pouch on the bottom (the submerged end) and empty. If desired, rinse the bag with soap and water. Cut a one inch strip and measure the laminate bond strength on a tensile tester. Do this as soon as possible after removing the pouch contents unless otherwise indicated. Examine interior of pouch for other visual defects.

Adhesive Preparation

The adhesive examples in Table 3 were prepared by combining the polyester from Example 4 with the additives shown the table followed by addition of solvent to obtain the desired final concentration then adding the isocyanate functional portion (Part B) and mixing for about 15 minutes. Laminates were made as described above. Table 3 shows that all of the adhesive blends gave laminates with good adhesion, but those with the amino silane/maleate polyester adducts (Examples 13 B, C) showed improved resistance to the food stimulant (1/1/1 sauce) when exposed to the boil in bag test and when compared with the comparative example 13A (no silane).

TABLE 3

Laminate testing of adhesives made with polyester from Example 4 and cured with the prepolymer Example 9.

|  | Example | | |
| --- | --- | --- | --- |
|  | 13A comp | 13B | 13C |
| Polyols | | | |
| Example 4 75.4% solids, 25 OHN) | 100 | 99 | 97 |
| Example 12B (APTES/Ex. 8) |  | 1 |  |
| Example 12A (APTES/Ex. 8) |  |  | 3 |
| Isocyanates | | | |
| Grams prepolymer, Example 9 | 22 | 22 | 23 |
| Moles NCO/OH | 1.4 | 1.4 | 1.4 |
| T-Peel test results | | | |
| Initial (gf/25.4 mm) | MOF* | MOF | MOF |
| PET-Al/808.24 | 532 AS | 269 AS | 198 AS |
| PET-Al/PET | 526 DES | 356 AS | 224 AS |
| PET/GF 19 | 289 DES | 274 AS | 192 AS |
| 24 hr (gf/25.4 mm) | | | |
| PET-Al/808.24 | 1507 FS | 1511 FS | 1575 FS |
| PET-AL/PET | 387 DES | 430 DES | 293 DES |
| PET/GF 19 | 814 DES | 664 DES | 1125 DES |
| 7 day (gf/25.4 mm) | | | |
| PET-Al/808.24 | 1779 FS | 1599 FS | 1681 FS |
| PET-Al/PET | 332 DES | 351 DES | 242 DES |
| PET/GF 19 | 824 DES | 1335 DES | 765 DES |
| Boil Bag 1, 1, 1 (0/25.4 mm) | | | |
| PET-Al/808.24 | 20 AT | 196 AS | 213 AS |

*Mode of Failure (MOF): Destruct, film breaks (DES, max), Adhesive split, adhesive on both films (AS, ave), Adhesive failure (AF, ave), Adhesive transfer, primary to secondary film (AT, Ave), Film Stretch (FS, max)

Example 14. Preparation of MDI Prepolymer with APTES

| Item | | Grams | % |
| --- | --- | --- | --- |
| 1 | ISONATE 125 M | 232 | 65.17% |
| 2 | VORANOL CP 450 | 40 | 11.24% |
| 3 | VORANOL 220-260 | 80 | 22.47% |
| 4 | 3-Aminopropyl triethoxysilane (Dynasylan ® AMEO) | 4 | 1.12% |
| | Total | 356 | 100.00% |

1. Item 1 (MDI) was placed in an oven and kept at 50° C. until it melted. A 4 neck flask was also placed in the 50° C. oven. The clear molten liquid was weighed into the warm 4 neck flask.
2. The flask was placed in a heating mantle and equipped with stirrer, thermocouple (connected to controller for heating mantle) and an inlet/outlet for dry nitrogen which was continuously passed through the reactor at slow rate.
3. The VORANOL polyols (Dow Chemical Co.) and DYNASYLAN AMEO (Evonic Co.), items 2-4, were added to give a white, hazy mixture.
4. The heater set point was set at 50° C., but the heat of the reaction caused the temperature to rise to about 90° C. in 20-30 minutes. The temperature was allowed to drop to 80° C. over 15-20 minutes.
5. The reaction was held at 80° C. for 30 minutes. During this time the mixture became clear except for some foam in the viscous liquid. A sample was drawn and testing showed 13.2% NCO.

Example 15. Preparation of MDI Prepolymer Similar to Example 14 but without APTES

| Item No. | Item | Grams | % |
| --- | --- | --- | --- |
| 1 | ISONATE 125 M | 225 | 65.22% |
| 2 | VORANOL CP 450 | 40 | 11.59% |
| 3 | VORANOL 220-260 | 80 | 23.19% |
| | Total | 345 | 100.00% |

Item 1 was melted by heating in an oven at 50° C. then added to a metal paint can that had been warmed to 50° C. The VORANOL polyols (items 2-3) were added and the mixture stirred for a few minutes. The can was flushed with dry nitrogen, sealed and placed in an oven and held at 50° C. overnight. The viscosity was measured with TA Instruments AR 2000 rheometer using a 25 mm parallel plate oscillating at 1 Hz. Viscosity at 25° C. was 149.4 Pa·s and at 70° C., 1.24 Pa·s.

Example 16. Preparation of MDI Prepolymer Similar to Example 14, but with the Addition of the Polyester Example 5 that Contains Maleate

| Item No. | Item | Grams | % |
| --- | --- | --- | --- |
| 1 | VORANOL CP 450 | 40 | 9.73% |
| 2 | VORANOL 220-260 | 80 | 19.46% |

-continued

| Item No. | Item | Grams | % |
|---|---|---|---|
| 3 | APTES | 6 | 1.46% |
| 4 | Example 5 | 20 | 4.87% |
| 5 | ISONATE 125 M | 265 | 64.48% |
| | Total | 411 | 100.00% |

1. The VORANOL polyols (Dow Chemical Co.) and the polyester Example 5 and DYNASYLAN AMEO (Evonic Co.), items 1-4 were added to a 4 neck 500 mL flask equipped with stirrer, thermocouple (connected to controller for heating mantle) and an inlet/outlet for dry nitrogen which was continuously passed through the reactor at slow rate.
2. Item 5 (MDI) was placed in an oven and kept at 50° C. until it melted. The molten liquid was added to the reactor all at once.
3. The temperature of the mixture was 40° C. and heater set point was set at 40° C., but the heat of the reaction caused the temperature to rise to about 80° C. in 20-30 minutes.
4. The reaction was held at 80° C. for 20-30 minutes. During this time the mixture became clear and light yellow except for some foam in the viscous liquid. A sample was drawn and testing showed 13.6% NCO.

The product was collected and viscosity was measured with TA Instruments AR 2000 rheometer using a 25 mm parallel plate oscillating at 1 Hz. Viscosity at 25° C., 117.1 Pa·s; at 70° C., 1.18 Pa·s.

Example 17. Prepare Prepolymer Similar to Example 16 without APTES

| Item No. | | Grams | % |
|---|---|---|---|
| 1 | ISONATE 125 M | 252 | 64.29% |
| 2 | VORANOL CP 450 | 40 | 10.20% |
| 3 | VORANOL 220-260 | 80 | 20.41% |
| 4 | Example 5 | 20 | 5.10% |
| | Total | 392 | 100.00% |

Item 1 was melted by heating in an oven at 50° C. then added to a metal paint can that had been warmed to 50° C. The VORANOL polyols (items 2-3) and the polyester Example 5 were added and the mixture stirred for a few minutes. The can was flushed with dry nitrogen, sealed and placed in an oven and held at 50° C. overnight. The viscosity was measured with TA Instruments AR 2000 rheometer using a 25 mm parallel plate oscillating at 1 Hz. Viscosity at 25° C. was 123.9 Pa·s and at 70° C., 1.25 Pa·s.

Example 18. Preparation and Testing Laminates Made from Polyester Resin Blend Example 4 and Prepolymers from Examples 14-17

The laminates were prepared and tested according to the methods described in Example 13. The results are summarized in the Table 4 below. The results show that all of the formulations gave good dry adhesion, but the addition of APTES Example 14 showed improved resistance to the 1/1/1 sauce in the boil in bag test when compared with the similar formulation Example 15 without APTES. The table also shows that the addition of the polyester with maleate (Example 17) does not give improved results by itself. But the combination of polyester (Example 5) and APTES as in Example 16 gave improved results over the comparative examples 14, 15 and 17.

TABLE 4

Laminates made from prepolymers with and without APTES or polyesters with maleate.

| Polyol Portion Part A | | | | | | | | |
|---|---|---|---|---|---|---|---|---|
| Example 4 Grams | 100 | | 100 | | 100 | | 100 | |

| Composition of NCO Prepolymer Coreactant (Part B) | | | | | | | | |
|---|---|---|---|---|---|---|---|---|
| | Ex. 14 | | Ex. 15 comp | | Ex. 16 | | Ex. 17 comp | |
| ISONATE 125M | 65.17% | | 65.22% | | 64.48% | | 64.29% | |
| VORANOL CP 450 | 11.24% | | 11.59% | | 9.73% | | 10.20% | |
| VORANOL 220-260 | 22.47% | | 23.19% | | 19.46% | | 20.41% | |
| APTES | 1.12% | | 0.00% | | 1.46% | | 0.00% | |
| Example 5 | | | | | 4.87% | | 5.10% | |
| Total Grams Coreactant | 20 | | 20 | | 19 | | 20 | |
| NCO/OH | 1.4 | | 1.4 | | 1.4 | | 1.4 | |
| T-Peel Test Results | | | | | | | | |
| Initial (gf/25.4 mm) | | MOF* | | MOF | | MOF | | MOF |
| PET-Al/808.24 | 250 | AS | 387 | AS | 350 | AS | 339 | AS |
| PET-Al/PET | 324 | AS | 346 | AS | 368 | AS | 400 | AS |
| PET/GF 19 | 155 | AS | 287 | AS | 445 | AS | 345 | AS |
| 24 hr (gf/25.4 mm) | | | | | | | | |
| PET-Al/808.24 | 1428 | FS | 1738 | FS | 1493 | FS | 1915 | FS |
| PET-AL/PET | 312 | DES | 500 | DES | 320 | DES | 367 | DES |

TABLE 4-continued

Laminates made from prepolymers with and without APTES or polyesters with maleate.

| | | | | | | | |
|---|---|---|---|---|---|---|---|
| PET/GF 19 7 day (gf/25.4 mm) | 645 | DES | 1188 | DES | 1248 | DES | 520 | DES |
| PET-Al/808.24 | 1479 | FS | 1767 | FS | 1564 | FS | 1707 | FS |
| PET-Al/PET | 281 | DES | 730 | DES | 308 | DES | 903 | DES |
| PET/GF 19 Boil Bag 1, 1, 1 | 809 | DES | 913 | DES | 1004 | DES | 970 | DES |
| PET-Al/808.24 | 224 | AT | 151 | AT | 458 | AT | 64 | AT |

*Mode of Failure (MOF): Destruct (DES, max), Adhesive split (AS, ave), Adhesive transfer (AT, Ave), Film Stretch (FS, max),

Example 19. Preparation of MDI Prepolymer

| Item Number | | Grams | % |
|---|---|---|---|
| 1 | VORANOL CP 450 | 60 | 16.48% |
| 2 | APTES | 4 | 1.10% |
| 3 | ISONATE 125 M | 240 | 65.93% |
| 4 | VORANOL 220-260 | 60 | 16.48% |
| | Total | 364 | 100.00% |

1. The VORANOL CP 450 (Dow Chemical Co.) and Dynasylan® AMEO (Evonic Co.), items 1 & 2, were added to a 4 neck 500 mL flask equipped with stirrer, thermocouple (connected to controller for heating mantle) and an inlet/outlet for dry nitrogen which was continuously passed through the reactor at slow rate.
2. Item 4 (MDI) was placed in an oven and kept at 50° C. until it melted. The molten liquid was added to the reactor all at once.
3. The initial temperature of the mixture was 48° C. and heater was turned off. The heat of the reaction caused the temperature to rise to about 70° C. in 20-30 minutes.
4. The VORANOL 220-260, item 4, (Dow Chemical Co.) was added and the temperature dropped to 62° C.
5. The reactor was heated to 80-90° C. and at this temperature for about 2.5 hours. The mixture appeared white due to foam from gas trapped in the viscous liquid.
6. An 85 gram portion of the product was combined with 15 grams of dry ethyl acetate to give clear solution. Viscosity was measured with TA Instruments AR 2000 rheometer using a 40 mm cone, 10 sec-1: 3719 mPa·s. Density 9.5985 lbs/gallon

Example 20. Preparation of Prepolymer Similar to Example 19 but with No APTES

| Item Number | | Grams | % |
|---|---|---|---|
| 1 | ISONATE 125 M | 234 | 66.10% |
| 2 | VORANOL CP 450 | 60 | 16.95% |
| 3 | VORANOL 220-260 | 60 | 16.95% |
| | Total | 354 | 100.00% |

1. Item 1 was melted by heating in an oven at 50° C. then added to a metal paint can that had been warmed to 50° C. The VORANOL CP 450 (items 2) was added and the mixture stirred for a few minutes.
2. The can was flushed with dry nitrogen, sealed and placed in an oven and held at 50° C. for 1 hour.
3. Item 3 was added and the solution mixed well under a stream of dry nitrogen, then placed in a 50° C. oven and kept in the oven overnight.
4. The product had the following properties: 13.1% NCO. The viscosity was measured with TA Instruments AR 2000 rheometer using a 25 mm parallel plate oscillating at 1 Hz. Viscosity at 25° C. was 407.2 Pa·s and at 70° C., 2.34 Pa·s.

Example 21. Preparation of MDI Prepolymer Similar to Example 20 but with the Maleate Containing Polyester, Example 5

| Item Number | | Grams | % |
|---|---|---|---|
| 1 | ISONATE 125 M | 224 | 65.12% |
| 2 | VORANOL CP 450 | 60 | 17.44% |
| 3 | VORANOL 220-260 | 30 | 8.72% |
| 4 | Example 5 | 30 | 8.72% |
| | Total | 344 | 100.00% |

1. Item 1 was melted by heating in an oven at 50° C. then added to a metal paint can that had been warmed to 50° C. The VORANOL CP 450 (items 2) was added and the mixture stirred for a few minutes.
2. The can was flushed with dry nitrogen, sealed and placed in an oven and held at 50° C. for 1 hour.
3. Item 3 was added and the solution mixed well under a stream of dry nitrogen, then placed in a 50° C. oven and kept in the oven overnight.
4. The product had the following properties: 13.3% NCO. The viscosity was measured with TA Instruments AR 2000 rheometer using a 25 mm parallel plate oscillating at 1 Hz. Viscosity at 25° C. was 458 Pa·s and at 70° C., 2.85 Pa·s.

Example 22. Prepare MDI Prepolymer Similar to Example 21 but with APTES Added

| Item Number | | Grams | % |
|---|---|---|---|
| 1 | VORANOL CP 450 | 60 | 16.48% |
| 2 | Example 5 | 30 | 8.24% |
| 3 | APTES | 4 | 1.10% |

-continued

| Item Number | | Grams | % |
|---|---|---|---|
| 4 | ISONATE 125 M | 240 | 65.93% |
| 5 | VORANOL 220-260 | 30 | 8.24% |
| | Total | 364 | 100.00% |

1. The VORANOL CP 450 (Dow Chemical Co.), DYNASYLAN AMEO (Evonic Co.) and Example 5, items 1-3, were added to a 4 neck 500 mL flask equipped with stirrer, thermocouple (connected to controller for heating mantle) and an inlet/outlet for dry nitrogen which was continuously passed through the reactor at slow rate.
2. Item 4 (MDI) was placed in an oven and kept at 50° C. until it melted. The molten liquid was added to the reactor all at once. The heater was off.
3. Within a few minutes, temperature of the mixture rose from 25° C. to 60° C. from the heat of reaction. The temperature continued to rise without external heat to about 70° C. in 10-20 minutes.
4. The VORANOL 220-260, item 5, (Dow Chemical Co.) was added and the temperature dropped to 72° C.
5. The reactor was heated to 80° C. and at this temperature for about one hour. The mixture appeared white due to foam from gas trapped in the viscous liquid.
6. The product was collected and viscosity was measured with TA Instruments AR 2000 rheometer using a 25 mm parallel plate oscillating at 1 Hz. Viscosity at 25° C., 275.5 Pa·s; at 70° C. 2.32 Pa·s.

An 85 gram portion of the product was combined with 15 grams of dry ethyl acetate to give clear solution. Viscosity was measured with TA Instruments AR 2000 rheometer using a 40 mm cone, 10 sec$^{-1}$: 2941 mPa·s. Density 9.6849 lbs/gallon.

Example 23. Laminate Tests for Adhesives Made with Prepolymers in Examples 19-22

Laminates were prepared and tested using the procedures described in Example 13. The results are summarized in the following tables. Generally, the formulations all gave good dry bonds. However, they differed in their resistance to delamination in the boil in bag test with 1/1/1/sauce. For example, Table 5 shows that shows that the combination of APTES and maleate polyester Example 5 mixed with the polyol Part A gave improved boil in bag performance Example 23D was better than the examples 23A-C. Adding APTES alone (Example 23B) gave some improvement over no additives (Example 23A) or maleate polyester alone (Example 23C).

Table 6 shows that adding the APTES and polyester Example 5 to the polyol side (Part A) was somewhat more beneficial in providing 1/1/1 sauce resistance than incorporating the APTES and polyester to the prepolymer (B component) as in Example 23D. But, Example 23D, E & F all gave better boil in bag results than the comparative examples 23A-C.

TABLE 5

Effect of adding 3-aminopropyl triethoxysilane (APTES), maleate polyester (Example 5) and combination of APTES and polyester Example 5 in the preparation of prepolymer coreactant.

| | Polyol Portion Part A | | | |
|---|---|---|---|---|
| | Ex. 23A | Example 23B | Ex. 23C | Ex. 23D |
| Ex. 4 Grams | 100 | 100 | 100 | 100 |

| Composition of NCO Prepolymer Coreactant (Part B) | | | | | | | |
|---|---|---|---|---|---|---|---|
| | Ex. 20 | comp | Ex. 19 | comp | Ex. 21 | comp | Ex. 22 |
| ISONATE 125M | 66.10% | | 65.93% | | 65.12% | | 65.93% |
| VORANOL CP 450 | 16.95% | | 16.48% | | 17.44% | | 16.48% |
| VORANOL 220-260 | 16.95% | | 16.48% | | 8.72% | | 8.24% |
| APTES | | | 1.10% | | | | 1.10% |
| Example 5 | | | | | 8.72% | | 8.24% |
| Grams Coreactant | 20 | | 24 | | 20 | | 23 |
| NCO/OH | 1.4 | | 1.4 | | 1.4 | | 1.4 |
| T-Peel Test Results | | | | | | | |
| Initial (gf/25.4 mm) | | MOF* | | MOF | | MOF | | MOF |
| PET-Al/808.24 | 354 | AS | 437 | AS | 361 | AS | 380 | AS |
| PET-Al/PET | 408 | AS | 489 | AS | 339 | AS | 447 | AS |
| PET/GF 19 | 279 | AS | 348 | AS | 314 | AS | 321 | AS |
| 24 hr (gf/25.4 mm) | | | | | | | | |
| PET-Al/808.24 | 1665 | FS | 1689 | FS | 1661 | FS | 1713 | FS |
| PET-AL/PET | 438 | DES | 210 | DES | 503 | DES | 549 | DES |
| PET/GF 19 | 988 | DES | 886 | DES | 1151 | DES | 624 | DES |

TABLE 5-continued

Effect of adding 3-aminopropyl triethoxysilane (APTES), maleate polyester (Example 5) and combination of APTES and polyester Example 5 in the preparation of prepolymer coreactant.

7 day (gf/25.4 mm)

| | | | | | | | |
|---|---|---|---|---|---|---|---|
| PET-Al/808.24 | 1610 | FS | 1724 | FS | 1071 | AT | 1452 | AT |
| PET-Al/PET | 306 | DES | 219 | DES | 454 | DES | 473 | DES |
| PET/GF 19 | 1179 | DES | 1073 | DES | 933 | DES | 1116 | DES |
| Boil Bag 1, 1, 1 | | | | | | | | |
| PET-Al/808.24 | 47 | AT | 67 | AS | 28 | AT | 253 | AT |

*Mode of Failure (MOF): Destruct (DES, max), Adhesive split (AS, ave), Adhesive transfer (AT, Ave), Film Stretch (FS, max)

TABLE 6

Effect of APTES in Part A (polyol)

Polyol Portion Part A

| | Example 23E | Example 23F |
|---|---|---|
| Example 4 Grams | 100 | 100 |
| APTES | 0.25 | 0.25 |
| Example 5 | 1.0 | 1.0 |
| Glycerin | | 0.25 |

Composition of NCO Prepolymer Coreactant (Part B)

| | Example 20 | Example 20 |
|---|---|---|
| ISONATE 125 M | 66.10% | 66.10% |
| VORANOL CP 450 | 16.95% | 16.95% |
| VORANOL 220-260 | 16.95% | 16.95% |
| Grams Coreactant | 22 | 25 |
| NCO/OH | 1.4 | 1.4 |

T-Peel Test Results

| Initial (gf/25.4 mm) | | MOF | | MOF |
|---|---|---|---|---|
| PET-Al/808.24 | 503 | AS | 657 | AS |
| PET-Al/PET | 460 | AS | 397 | AS |
| PET/GF 19 | 241 | AS | 300 | AS |
| 24 hr (gf/25.4 mm) | | | | |
| PET-Al/808.24 | 1731 | FS | 1853 | FS |
| PET-AL/PET | 207 | DES | 293 | DES |
| PET/GF 19 | 981 | DES | 931 | DES |
| 7 day (gf/25.4 mm) | | | | |
| PET-Al/808.24 | 1832 | FS | 1863 | FS |
| PET-Al/PET | 797 | DES | 476 | DES |
| PET/GF 19 | 877 | DES | 1276 | DES |
| Boil Bag 1,1,1 (gf/25.4 mm) | | | | |
| PET-Al/808.24 | 615 | AS | 517 | AS |

Mode of Failure (MOF): Destruct (DES, max), Adhesive split (AS ave), Adhesive transfer (AT, Ave), Film Stretch (FS, max), Table 7 shows that adding the silane and polyester (Example 5) to part A combined with a prepolymer coreactant containing silane (Example 23G) gave further improvement over silane in only one of the components (Example 23E) and both Example 23 G & H gave better boil in bag results than comparative examples, Example 23 A-C. But including the maleate polyester (Example 23G) gave better results than the comparative Example 23H without the polyester Example 5.

TABLE 7

Effect of adding APTES and polyester Example 5 to polyol (Part A) and APTES to prepolymer (Part B)

Polyol Portion Part A

| | Example 23G | Example 23H |
|---|---|---|
| Example 4 Grams | 100 | 100 |
| APTES | 0.25 | 0.25 |
| Example 5 | 1 | |

Composition of NCO Prepolymer Coreactant (Part B)

| | Example 19 | Example 19 |
|---|---|---|
| ISONATE 125 M | 65.93% | 65.93% |
| VORANOL CP 450 | 16.48% | 16.48% |
| VORANOL 220-260 | 16.48% | 16.48% |
| APTES | 1.10% | 1.10% |
| Grams Coreactant | 26 | 24 |
| NCO/OH | 1.4 | 1.4 |

T-Peel Test Results

| Initial (gf/25.4 mm) | | MOF | | MOF |
|---|---|---|---|---|
| PET-Al/808.24 | 236 | AS | 401 | AS |
| PET-Al/PET | 344 | AS | 368 | AS |
| PET/GF 19 | 300 | AS | 168 | AS |
| 24 hr (gf/25.4 mm) | | | | |
| PET-Al/808.24 | 1602 | FS | 1778 | FS |
| PET-AL/PET | 252 | DES | 368 | DES |
| PET/GF 19 | 775 | DES | 730 | DES |
| 7 day (gf/25.4 mm) | | | | |
| PET-Al/808.24 | 1619 | FS | 1568 | FS |
| PET-Al/PET | 262 | DES | 460 | DES |
| PET/GF 19 | 1045 | DES | 616 | DES |
| Boil Bag 1,1,1 (0/25.4 mm) | | | | |
| PET-Al/808.24 | 1108 | AT | 692 | AT |

Mode of Failure (MOF): Destruct (DES, max), Adhesive split (AS, aye), Adhesive transfer (AT, Ave), Film Stretch (FS, max)

Table 8 shows that the polyester prepolymer (Example 10) gave good adhesion when cured with blends of polyols. Example 23I showed that the two component adhesive gave good bonds, but poor resistance to the 1/1/1 sauce in the boil in bag test. Adding the maleate polyester (Example 5) plus APTES (Example 23 K and L) dramatically improved the boil in bag test results. Increasing the amount of APTES from 0.2 to 0.4 (Example 23L) resulted in some precipitate formation in the mixed adhesive with no apparent benefit over the lower level of APTES. Adding the maleate polyester Example 5 alone (comparative Ex. 23J) showed minimal benefit over comp. Ex. 23I and much poorer results than Ex. 23K & L.

TABLE 8

Test results for laminates made with polyester prepolymer,
Example 10, and using Example 7 polyester-polyether polyol as coreactant with maleate
polyester (Example 5) and APTES to improve product resistance

|  | Ex. 23I | | Ex. 23J | | Ex. 23K | | Ex. 23L | |
|---|---|---|---|---|---|---|---|---|
| Polyester prepolymer, Ex. 10 | 100 | | 100 | | 100 | | 100 | |
| Coreactant | | | | | | | | |
| Ex. 7 | 6.4 | | 4.3 | | 4.0 | | 3.7 | |
| Ex. 5 | 0 | | 3.2 | | 3.0 | | 2.8 | |
| APTES | 0 | | 0 | | .2 | | .4 | |
| NCO/OH Equivalents | 2.0 | | 2.0 | | 2.1 | | 2.2 | |
| Mixed Adhesive Appearance | Clear | | Clear | | Clear | | precip. | |
| T-Peel Test results | | | | | | | | |
| Prelam/GF19 | | MOF | | MOF | | MOF | | MOF |
| Initial (gf/25.4 mm) | 523 | AS | 380 | AS | 470 | AS | 457 | AS |
| 1 day | 1100 | FT | 1155 | FT | 780 | FT | 919 | FT |
| 7 d | 753 | FT | 1126 | FT | 1222 | FS | 1082 | FT |
| 14 d | 770 | FT | 1147 | FT | 1208 | FT | 991 | FS |
| Boil in Bag, 1/1/1 sauce | 18 | AT | 184 | AS | 1034 | AS | 949 | AS |
| Prelam/808.24 | | | | | | | | |
| Initial (gf/25.4 mm) | 484 | AS | 488 | AS | 439 | AS | 484 | AS |
| 1 d | 1716 | FS | 1642 | FS | 1640 | FS | 1635 | FS |
| 7 d | 1445 | FS | 1592 | FS | 1494 | FS | 1532 | FS |
| 14 d | 1453 | FS | 1527 | FS | 1601 | FS | 1565 | FS |
| Boil in Bag, 1/1/1 sauce (gf/25.4 mm) | 16 | AT | 155 | AS | 1042 | AS | 989 | AS |

Mode of Failure (MOF): Destruct (DES, max), Adhesive split (AS, ave), Adhesive transfer (AT, Ave), Film Stretch (FS, max)
Furthermore, Example 23M with the combination of APTES and maleate polyester (Example 5) gave much better boil in bag test results than the comparative examples 23N-P with no additives or with APTES or Example 5 polyester alone.

|  |  | 23M | | 23N | | 23O | | 23P | |
|---|---|---|---|---|---|---|---|---|---|
| Pt. A | prepolymer | g | | g | | g | | g | |
|  | Example 10 | 100 | | 100 | | 100 | | 100 | |
| Pa. B | polyols | | | | | | | | |
|  | Example 7 | 6 | | 7.25 | | 6 | | 7 | |
|  | Example 5 | 1.5 | | | | 1.5 | | | |
|  | APTES | 0.25 | | | | | | 0.25 | |
|  | Total OH | 7.75 | | 7.25 | | 7.5 | | 7.25 | |
|  | NCO/OH Equivalents | 1.80 | | 1.70 | | 1.80 | | 1.70 | |
|  | T-Peel Test Results | gf/25.4 mm | | | | | | | |
|  | Prelam/808.24 | Ave | MOF | Ave | MOF | Ave | MOF | Ave | MOF |
|  | Initial | 273 | AS | 340 | AS | 274 | AS | 322 | AS |
|  | 1 d | 1211 | FS | 1326 | FS | 1120 | FS | 1120 | FS |
|  | 7 d | 1295 | FS | 1402 | FS | 1231 | FS | 1176 | FS |
|  | boil in bag 1/1/1 | 650 | AS | 78 | AS | 80 | AT | 21 | AT |

Example 24. Preparation of Prepolymer from Polyester Resin Example 2 and MDI

| Item Number | Item | Percent of Charge |
|---|---|---|
| 1 | ISONATE 125 M MDI | 13.5 |
| 2 | Polyester Resin Example 2 | 86.5 |

1. MDI (item 1) was melted in a 50° C. oven.
2. Item 2, the polyester resin solution Example 2, 75% solids in ethyl acetate) was placed in a four neck flask equipped with stirrer, nitrogen inlet/outlet and thermocouple attached to a controller for a heating mantle
3. The reactor was kept under an atmosphere of dry nitrogen and the molten MDI (item 1) was added. There was a slight rise in temperature from the heat of reaction.
4. The solution was gradually heated to 80° C.
5. After holding at 80° C. for one hour, the product was cooled, filtered and packaged.

Analysis: 2.85% NCO by titration, 79.8% solids, 3580 mPa·s at 25° C.

Example 25. One Component Adhesives

Preparation of One Component Adhesives

One component adhesives were prepared by combining APTES with the maleate polyesters Example 5 or Example 9 in the proportions shown in Table 9. There was some temperature rise from the heat of reaction. The solutions were allowed to stand without external heating for about 30 minutes then combined with the prepolymers described in Example 10 and Example 24 and diluted with ethyl acetate to about 35-38% solids. The resulting solutions were kept at room temperature for about 1 hour to allow the isocyanates to react with the maleate polyester/APTES adduct. The additive is expected to reduce the NCO of the prepolymer by about 0.2% from the starting value of about 2.4-2.8% NCO. The product was a clear solution. Adding APTES directly to these prepolymers would result in formation of an insoluble product and a hazy solution.

Preparation of Laminates

The laminates were prepared on an Egan laminator using a gravure cylinder with quadrangular cells at 150 lines/inch (60 lines/cm) having a volume of approximately 14.8 BCM (billion cubic microns). Adhesives were applied at a dilution of 35-40% solids in ethyl acetate to provide a coat weight of 1.5-2.0 pounds/ream (2.5-3.25 g/m$^2$). Line speed was 100-150 ft/minute (30-45 m/min). Except for the aluminum foil and metalized PET, the films were corona treated in line to obtain surface energy>40 dynes/cm.

The one component adhesives with the additives (Table 9) show improved boil in bag test results for the prelam-foil/PE laminate (Examples 25 B & C) over the comparative Example 25A. Also, the additives were observed to improve flow and wetting which may partially account for the better bonds for PET/PE and mPET/PE structures when the additives were present compared to Example 25A with no additives. Silanes interact with metals, but would not necessarily be expected to improve bonds to PET.

Table 10. shows further evidence that adding the combination of maleate polyester (Example 5) and APTES (Example 25E provides better boil in bag resistance compared with Example 25D.

TABLE 10

One component adhesives from prepolymer, Example 10.

|  | Example 25D comp Grams | Example 25E Grams |
|---|---|---|
| Example 10 | 6300 | 6006 |
| Additives |  |  |
| APTES | 0 | 11 |
| Example 5 | 0 | 63 |
| Ethyl Acetate | 6134 | 5920 |
| Expect 2.6% NCO after adds |  |  |
| T-Peel Test results gf/25.4 mm |  |  |
| Primary Web | Prelam FOIL | Prelam FOIL |
| Secondary Web | 808.24 | 808.24 |
| Initial bonds | 399 | 429 |
| Mode of Failure | AS | AS |
| 24 Hrs | 1623 | 1236 |
| Mode of Failure | FS | AT |
| 7 Days | 1566 | 1401 |
| Mode of Failure | FS | AS |
| 30 Days | 1454 | 1354 |
| Mode of Failure | FS | AS |
| Boil in Bag 1/1/1 | 236 | 454 |
| Boil in Bag water | 642 | 875 |

TABLE 9

One component adhesives from Example 24.

|  | Example 25A Grams | | Example 25B Grams | | Example 25C Grams | |
|---|---|---|---|---|---|---|
| Polyester prepolymer Example 24 | 6125 | | 5983 | | 5941 | |
| Additives |  |  |  |  |  |  |
| APTES | 0 | | 14.7 | | 14.7 | |
| Example 5 | 0 | | 98.3 | | 0 | |
| Example 8 | 0 | | 0 | | 123 | |
| T-Peel Test results |  |  |  |  |  |  |
| Prelam/GF19 | gf/25.4 mm | MOF | gf/25.4 mm | MOF | gf/25.4 mm | MOF |
| Initial | 165 | AS | 402 | AS | 401 | AS |
| 1 day | 424 | AT | 907 | FT | 873 | FT |
| 7 d | 424 | AT | 936 | FT | 877 | FT |
| 14 d | 436 | AT | 901 | FT | 931 | FT |
| Boil in Bag, 1/1/1 sauce | 154 | AT | 610 | AS | 230 | AT |
| 48LBT/GF19 |  |  |  |  |  |  |
| Initial | 134 | AS | 244 | AS | 287 | AS |
| 1 d | 327 | AT | 662 | FT | 868 | FT |
| 7 d | 322 | AT | 495 | FT | 899 | FT |
| 14 d | 328 | AT | 528 | FT | 835 | FT |
| Boil in Bag, 1/1/1 sauce | 330 | FT | 312 | FT | 467 | FT |
| mPET/GF19 |  |  |  |  |  |  |
| Initial | 236 | Zippy | 162 | AT | 237 | AS |
| 1 d | 354 | Zippy | 325 | AT | 530 | FT |
| 7 d | 304 | AT | 399 | FT | 374 | FT |
| 14 d | 304 | AT | 413 | FT | 614 | FT |

The invention claimed is:

1. A polyester polyol which has a structure shown in formula (II)

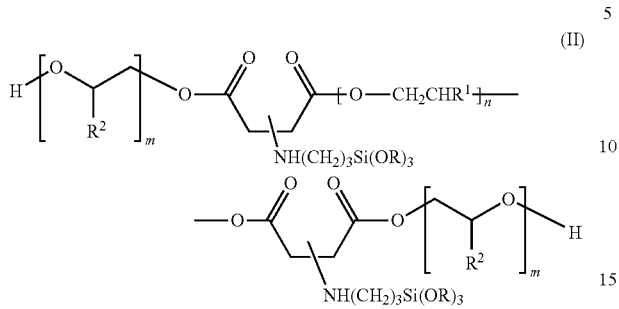

(II)

wherein $R^1$ is hydrogen and $R^2$ is methyl, m is from 4 to 8, n is from 4-10 and R is a $C_1$-$C_4$ alkyl group.

2. A two-component polyurethane system comprising: (a) a polyol component comprising from 0.2 to 100 wt % of a polyester polyol which has a structure shown in formula (II)

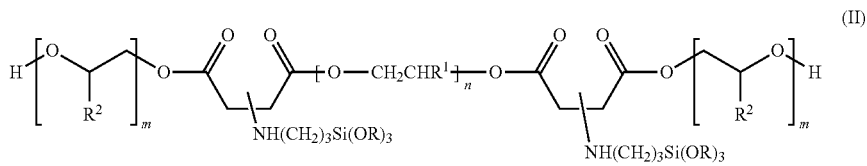

(II)

wherein $R^1$ is hydrogen and $R^2$ is methyl, m is from 4 to 8, n is from 4-10 and R is a $C_1$-$C_4$ alkyl group; and (b) an isocyanate-terminated prepolymer comprising polymerized residues of: (i) at least one diisocyanate selected from the group consisting of diphenyl methane diisocyanate and toluene diisocyanate, and (ii) a glycol having $M_n$ from 300 to 3500; said glycol being polyethylene glycol, polypropylene glycol or a mixture thereof.

* * * * *